UNITED STATES PATENT OFFICE.

GUSTAV GEORGE TIEMANN, OF SAN FRANCISCO, CALIFORNIA.

PROCESS OF PURIFYING SACCHARINE JUICES.

SPECIFICATION forming part of Letters Patent No. 518,538, dated April 17, 1894.

Application filed November 17, 1892. Renewed March 14, 1894. Serial No. 503,641. (No specimens.)

*To all whom it may concern:*

Be it known that I, GUSTAV GEORGE TIEMANN, a subject of the Emperor of Germany, residing in the city and county of San Francisco, State of California, have invented certain new and useful Improvements in the Manufacture of Sugar; and I do hereby declare the following to be a full, clear, and exact description of said invention, such as will enable others skilled in the art to which it most nearly appertains to make, use, and practice the same.

My invention relates to an improved process for rectifying and purifying juices containing sugar, especially the juice of the sugar beet, sugar cane, sorghum and the sap of the maple tree. In the treatment of sugar juices, alkali in some form is necessarily used to neutralize the free acids contained in the juice; but its presence in large quantities is highly deleterious, because it acts chemically upon the crystallizable portion, forming an alkali saccharate, which is non-crystallizable, thus increasing the quantity of molasses, and causing a loss of sugar product.

My invention consists mainly in treating the juice with fractional quantities or doses of alkali, instead of adding the entire quantity at once, and then saturating the juice with carbonic acid after each dose, so that at no time will there will be an excess of alkali in the juice. I then follow this fractional alkali treatment with a subsequent fractional treatment with carbonic acid and a mixture of carbonic acid gas and sulphurous acid gas. My process will then consist of the following several steps, viz: first, submitting the raw filtered juice to the action of ozone and heat in order to decompose the albumen contained in it; secondly, in subjecting the boiled juice to a repeated fractional treatment with caustic lime or magnesia, or both; thirdly, in subjecting the juice to repeated fractional treatment with carbonic acid, and carbonic and sulphurous acid combined, until the alkali is removed; fourthly, evaporating the treated juice by the usual vacuum pan process; fifthly, separating the sugar from the liquid portion by the usual centrifugal operation; and sixthly, treating the liquid residue with a solution of chloride of sodium, all as hereinafter more fully described.

In carrying out my improved process I take the raw juice and filter it so as to remove extraneous matter. It is then placed in a pan, under which heat is applied, and during the process of heating I inject ozone under pressure into the liquid during the entire heating operation until the juice is brought to the boiling point. This ozonizing process decomposes the albumen contained in the juice, thereby preparing it to be acted upon by the subsequent treatment, and causing it to be more easily separated.

Basing now the application of my improved process on the treatment of the juice obtained from the sugar beet, I next proceed to determine the proportion of sugar contained in the liquid juice, and thus obtain the purity co-efficient. Having determined the proportion of sugar, I bring the liquid to a boiling heat, and then add to it a quantity of caustic lime equal to about one per cent. of the original weight of beets, from which the juice was expressed, or instead of the caustic lime I can use its equivalent of caustic magnesia. This proportion will vary in a slight degree, but is based on a purity co-efficient of eighty-two per cent. If the purity co-efficient is less the proportion of caustic alkali or magnesia required is increased. At the same time I saturate the liquid with carbonic acid until the test of alkali shows not more than two tenths of one per cent. When this limit is reached I again add caustic lime or magnesia, but in this second treatment I only use about one half of one per cent. of the original weight of the beets of caustic lime or magnesia instead of the one per cent. first used. After this I again saturate with carbonic acid until the alkali test shows not more than two-tenths of one per cent. This is what I call the second alkali treatment. I now proceed to a third alkali treatment by a further addition of caustic lime or magnesia, or both, to the liquid juice; but instead of adding one-half of one per cent. of the original weight of the beets I only add about one-quarter of one per cent., when I again saturate with carbonic acid ($CO_2$) until the alkali test again shows two-tenths of one per cent. as before. When I have carried the treatment to this point I filter the liquid, and again bring it to a boiling heat, and then inject a mixture of carbonic acid gas ($C.O_2$) and sulphurous acid gas ($S.O_2$) in the proportion of three parts of carbonic acid gas to one part of sulphurous acid gas, until the saturation is carried down to one one-hundredth of one per cent. of alkali. I now filter the liquid again, and boil or concentrate the liquid down to forty or fifty per cent. sugar, when I proceed to further saturate it with a mixture of carbonic acid gas and sulphurous acid gas, in the proportion above specified, until the alkali test shows one one-hundredth of one per cent. This fractional treatment enables me to obtain a thorough alkali saturation and a final elimination of the alkali and impurities, by reason of which I can produce a larger proportion of sugar product and a better sirup or residue. Having subjected the liquid juice to this fractional treatment, it then goes to the vacuum pan for evaporation, and from there to the centrifugal machine, in both of which places it receives the usual and ordinary treatment. The residue or molasses which comes from the centrifugal machine I then boil down and add a solution of chloride of sodium, in the proportion of one part of salt to three parts water, taking care that the amount of salt is equal to one per cent. of the sugar contained in the molasses. After this the sugar is allowed to crystallize, when the molasses can again be passed through the centrifugal machine to remove any sugar that may remain.

In treating cane juice, sorghum and the sap of the maple tree I employ the same general process, only I determine the proportion of caustic alkali to be used in the fractional treatment by first obtaining the purity co-efficient of the juice or sap, and then determine the proportion of caustic alkali or magnesia in a like manner, as above described. By ozonizing the raw juice, and then submitting it to fractional treatment with caustic lime or magnesia, or both, the precipitates are caused to be of a sandy nature, so that they filter more rapidly, thereby materially increasing the capacity of the filtering presses. Juices treated by this process show a purity co-efficient of about ninety-four, and will yield a sugar of high polarization. The addition of chloride of sodium to the last products increases both the quantity and quality of that product, and as a consequence decreases the quantity of molasses and the consequent loss of sugar.

This improved process is equally adapted for raw sugar factories or refineries. It can be accomplished with the machinery and apparatus now used in such factories and refineries, and result in a material saving both in time, labor and final results.

Having thus described my invention, what I claim, and desire to secure by Letters Patent, is—

The process of treating sugar juices, consisting in first subjecting the raw filtered juice to the combined action of ozone and heat; secondly, subjecting it to fractional treatment with caustic alkali in the presence of heat; thirdly, subjecting the juices to a fractional treatment with carbonic acid and finally to the action of a mixture of carbonic acid gas and sulphurous acid gas, substantially as above specified.

GUSTAV GEORGE TIEMANN.

Witnesses:
JULIUS KOEBIG,
CHAS. J. ARMBRUSTER.